(12) United States Patent
Liu et al.

(10) Patent No.: US 6,560,378 B1
(45) Date of Patent: May 6, 2003

(54) COMPACT POLARIZATION COUPLERS

(75) Inventors: Weimin Liu, Sunnyvale, CA (US); Li Wang, San Jose, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 09/921,791

(22) Filed: Aug. 2, 2001

(51) Int. Cl.[7] .................................................. G02B 6/00
(52) U.S. Cl. ........................ 385/11; 354/483; 354/494; 385/33; 385/34
(58) Field of Search ............................... 385/11, 34, 35, 385/33; 354/483–502

(56) References Cited

U.S. PATENT DOCUMENTS 5,740,288 A * 4/1998 Pan .............................. 385/11
6,097,749 A * 8/2000 Naoe et al. ................. 372/103

FOREIGN PATENT DOCUMENTS

WO    WO 02/21192 A1 * 3/2002

* cited by examiner

*Primary Examiner*—Hemang Sanghavi
*Assistant Examiner*—Scott Knauss
(74) *Attorney, Agent, or Firm*—Joe Zheng; C. P. Chang; Pacific Law Group, LLP

(57) ABSTRACT

The present invention, generally speaking, provides compact design of optical couplers for combining two differently polarized light beams onto a collimator or splitting a composed light beam into two differently polarized light beams. According to another embodiment, the size of the polarization beam combiner is minimized by using a pair of specially designed fiber collimators that use an asymmetrical sleeve. As a result, a coupler, according to the present invention, uses less components, is of small in size and provides an easy-aligning structure. Further the coupler offers lower optical insertion loss with minimized physical size.

16 Claims, 5 Drawing Sheets

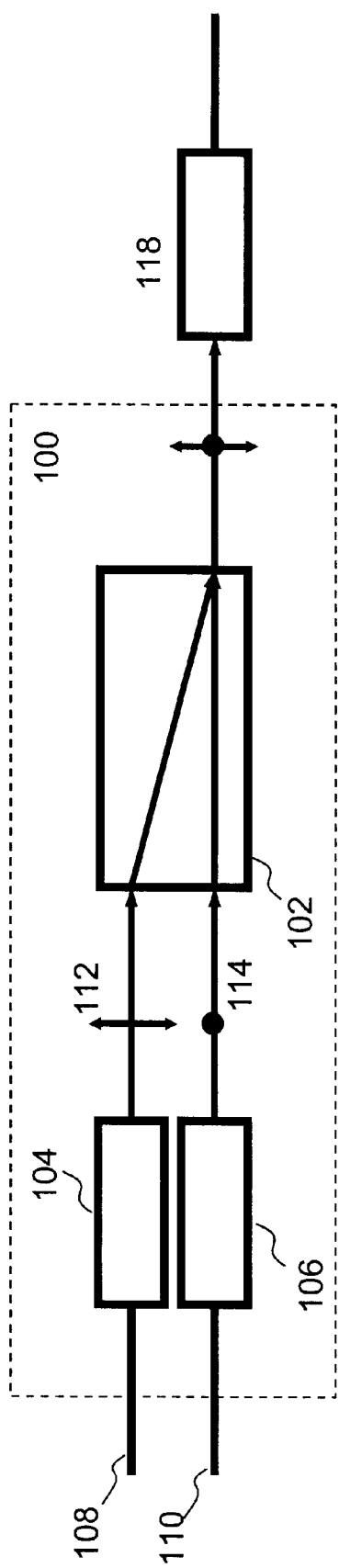

COMPACT POLARIZATION COUPLERS

BACKGROUND OF THE INVENTION

1. Technical Field

The invention relates to fiber optical couplers. More particularly, the invention relates to compact designs of polarization combiners/splitters including at least two collimators that are arranged in such a way that the overall size of the polarization couplers is reduced without loss of performance thereof.

2. Description of the Prior Art

Optical telecommunications generally involves the use of light beams propagating through optical fibers to transmit data from one end to another end. When an optical fiber carrying an input data signal that needs to be connected to two destinations, the signal needs to be split into two. This is achieved in the art by a coupler. When used for the splitting purpose, it is often referred to as a splitter. Generally, a coupler is bi-directional. When a coupler is used to combine two signals respectively from two sources, the coupler is used as a combiner to combine the two signals onto a single optical fiber.

As the light beams travel through the optical fiber, they may be distorted by the fiber in a number of ways. One type of distortion caused by optical fiber is polarization mode dispersion, which refers to an effect that an optical device may have on different polarizations of a light beam. In many applications, polarized light beams are used to ensure desirable effects of all optical devices involved. There is, therefore, a need for a polarization coupler that maintains respective polarization of light beams going therethrough while being small in size without compromising system performances thereof.

SUMMARY OF THE INVENTION

The present invention, generally speaking, provides compact design of optical couplers for combining two differently polarized light beams onto a collimator or splitting a composed light beam into two differently polarized light beams. The description herein is largely based on a polarization beam combiner (PBC) and is equally applied to a coupler used as a splitter. According to one embodiment, the polarization beam combiner employs a birefringent crystal to allow efficient combination of two orthogonally polarized light beams (e.g. pump lasers) into one composed or depolarized light beam. According to another embodiment, the size of the polarization beam combiner is minimized by using a pair of specially designed fiber collimators. As a result, a coupler, according to the present invention, uses less components, is of small in size and provides an easy-aligning structure. Further the coupler offers lower optical insertion loss with minimized physical size.

In one implementation, the present invention is an optical combiner for combining two differently polarized light beams onto a collimator. The combiner comprises two collimators outputting respectively a first and a second polarized light beams, wherein both of the two collimators have an outer diameter and a sleeve that is so shaped on one side that, when two such collimators are arranged next to each other, a distance between centers of the two collimators is less than the diameter; and a crystal receiving the first and the second polarized light beams respectively from the two collimators and combining the first and the second polarized light beams into a combined light beam.

In another implementation, the present invention is an optical splitter for splitting a composed light beam into two differently polarized light beams. The splitter comprises a crystal receiving an incoming light beam and splitting the incoming light beam into a first and a second polarized light beams; and two collimators coupled to the crystal at one end and respectively receiving the first and the second polarized light beams, wherein both of the two collimators have an outer diameter and a sleeve that is so shaped on one side that, when two such collimators are arranged next to each other, a distance between centers of the two collimators is less than the diameter.

One of the objects of the present invention is to provide an optical coupler that is small in size while providing an easy-aligning structure.

Other objects, features, and advantages of the present invention will become apparent upon examining the following detailed description of an embodiment thereof, taken in conjunction with the attached drawings.

BRIEF DESCRIPTION OF THE DRAWINGS

FIG. 1 shows a combiner according to one embodiment of the present invention;

DETAILED DESCRIPTION OF THE INVENTION

Figure 2A:
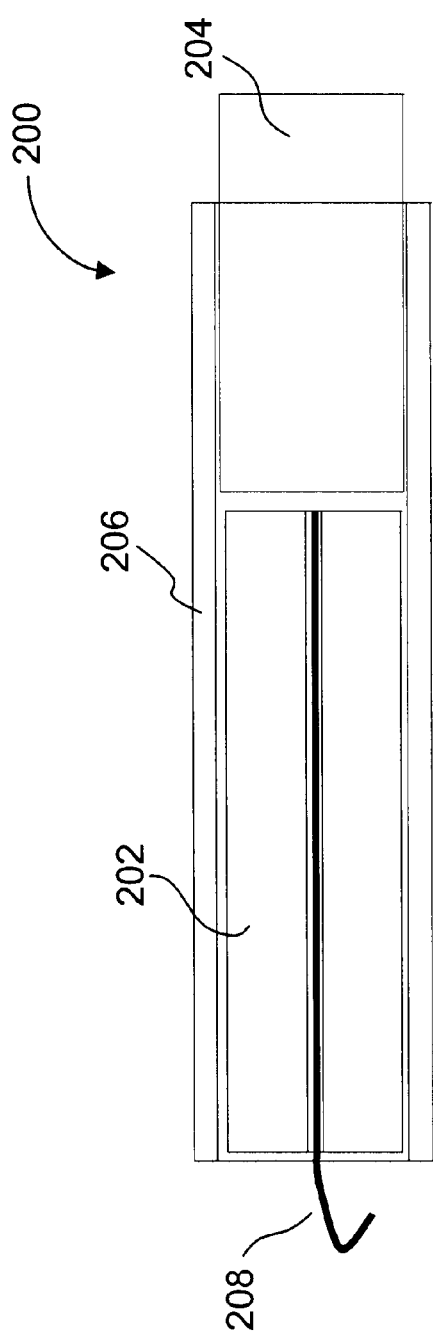
FIG. 2A shows an exemplary collimator that may be used in the combiner of FIG. 1.

The present invention pertains to compact designs of polarization couplers and a method thereof. The description herein is based on a polarization beam combiner (PBC) and is equally applied to a coupler used as a splitter. According to one embodiment, the polarization beam combiner employs a birefringent crystal to allow efficient combination of two orthogonally polarized light beams (e.g. pump lasers) into one depolarized light beam. According to another embodiment, the size of the polarization beam combiner is minimized by using a pair of specially designed fiber collimators. As a result, a coupler, according to the present invention, uses less components, is of small in size and provides an easy-aligning structure. Further the coupler offers lower optical insertion loss with minimized physical size.

The detailed description of the present invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Referring now to the drawings, in which like numerals refer to like parts throughout the several views. FIG. 1 shows a combiner 100 according to one embodiment of the present invention. The combiner 100 includes a birefringent or walk-off crystal 102, and a pair of collimators 104 and 106. Two polarized light beams coming through two respective fibers 108 and 110 are respectively collimated by the collimators 104 and 106. For illustration purpose, two orthogonally polarized light beams 112 and 114 are from the collimators 104 and 106 and coupled to the crystal 102. The characteristics of the crystal 102 combines the two orthogonally polarized light beams 112 and 114 into a depolarized light beam 116 that is further led onto a single collimator 118. Depending on an exact implementation, the collimator 118 may or may not be included in the combiner 100.

Generally, it is desirable to have a coupler being of a reduced size since smaller sizes can reduce the overall cost and weight of a fiber optical system and can thus increase the portability and reliability. According to one embodiment, the collimators 104 and 106 are designed in such a way that the combined size of the collimators reaches a minimum without affecting the performance of each of the collimators.

Figure 2B:
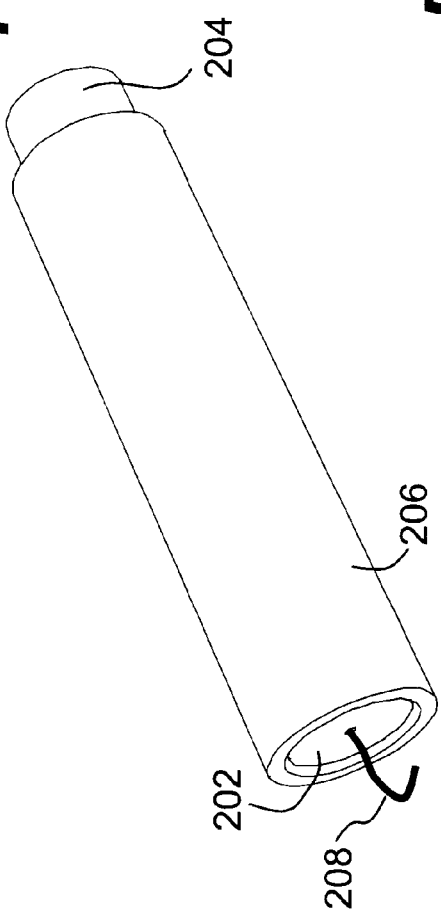
FIG. 2B shows a perspective view of the collimator of FIG. 1A.

FIG. 2A shows an exemplary collimator 200 that may be used in the combiner 100 of FIG. 1. The collimator 200 comprises a ferrule 202, a rod lens 204 and a cylindrical sleeve, wherein a fiber 208 is encapsulated in the ferrule 202. A perspective view of the collimator 200 is shown in FIG. 2B. The minimum achievable size of a collimator is determined by the outer diameter of the cylindrical sleeve for a given size of the rod lens and ferrule.

Figure 2C:
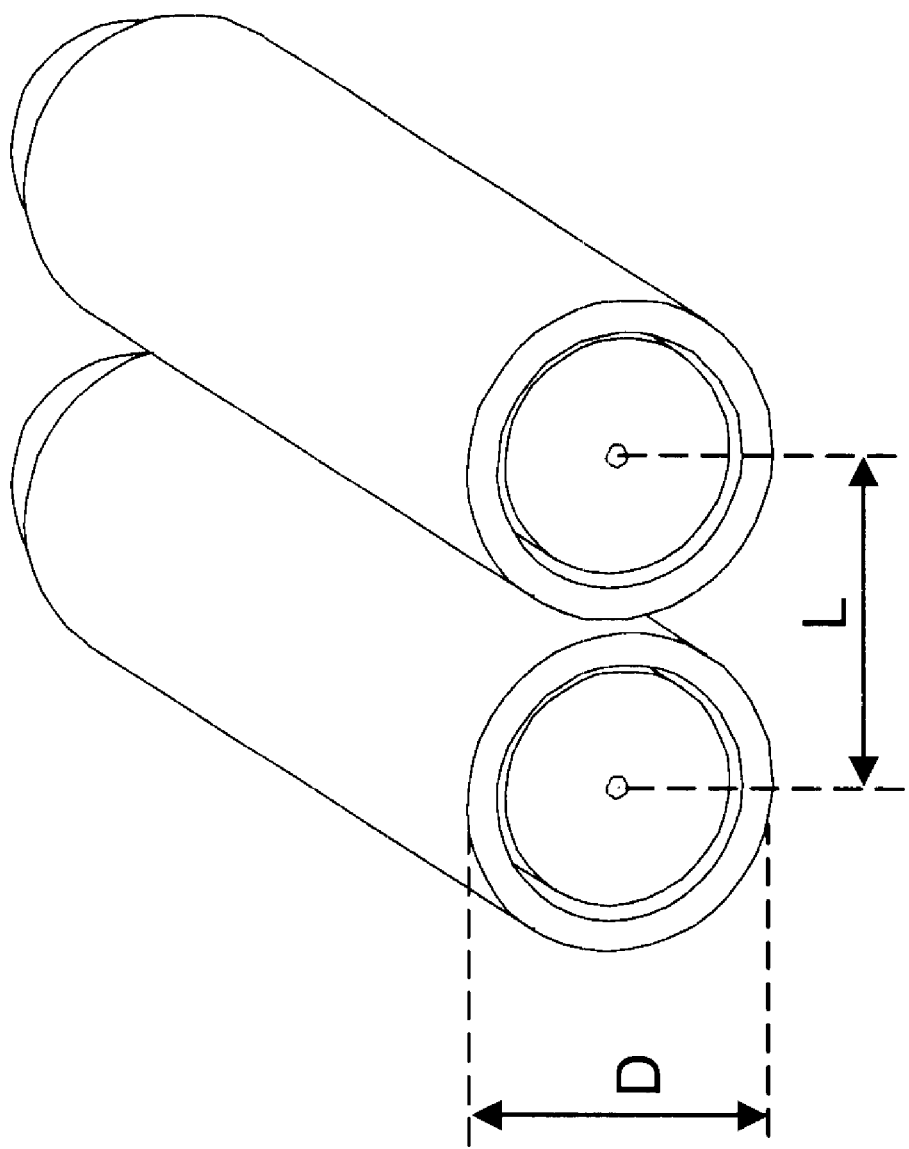
FIG. 2C illustrates two collimators are arranged next to each other.
Figure 3:
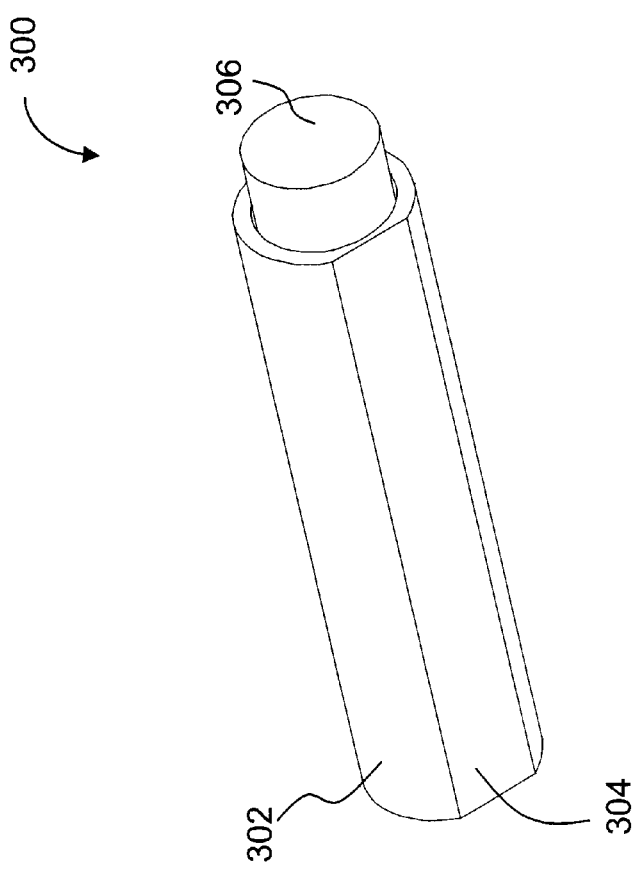
FIG. 3 shows an improved design of a collimator according to one embodiment of the present invention.

When two such collimators are arranged next to each other as shown in FIG. 2C, the center to center distance L of the two adjacent collimators cannot be less than D the outer diameter of the cylindrical sleeve. FIG. 3 shows an improved design of a collimator 300 according to one embodiment of the present invention. Different from the collimators in the prior art, the collimator 300 has a sleeve 302 that is made asymmetric. In other words, sleeve 302 has a chopped or flattened portion 304 so that, when two such collimators are arranged together with the flattened portions facing to each other, the lateral distance L of the two combined collimators is shorter than twice the outer diameter of the collimator. Depending on an exact implementation, the depth of the chopped portion 304 can be adjusted. If a pre-determined space 2D-2Δ is allowed to accommodate two lateral arranged collimators, the depth of the chopped portion 304 of the collimator 300 can go as much as Δ without affecting the ferrule (not shown) and the optical lens 306.

One exemplary method for achieving such collimators with an asymmetric sleeve is to remove mechanically the chopped portion from a collimator with a symmetric or cylindrical sleeve. The chopped portion can be removed according to a pre-defined size so that two or more of such collimators can be intimately arranged next to each other in such a way that the combined size reaches a minimum without affecting the performance of each of the collimators.

Figure 4:
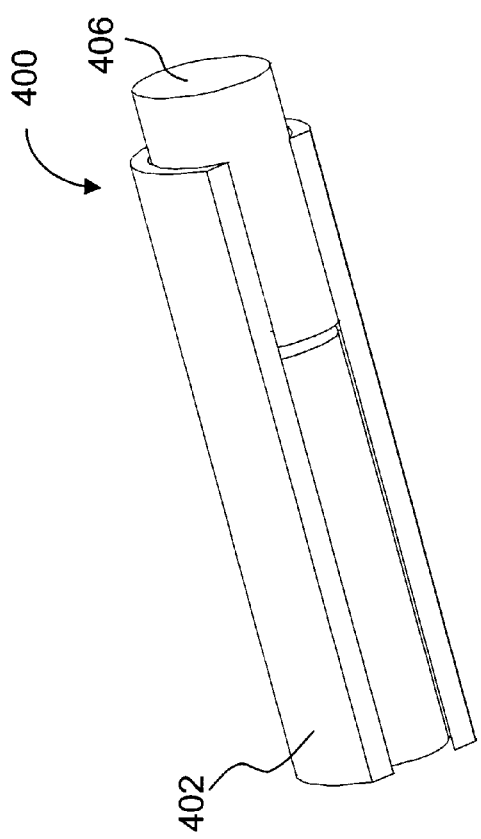
FIG. 4 shows another improved design of a collimator according to one embodiment of the present invention.

FIG. 4 shows another improved design of a collimator 400 according to one embodiment of the present invention. The collimator 400 has a sleeve 402 that is opened on one side. In comparison to the collimator 300 of FIG. 3, the collimator 300 is an extreme case in which the inner surface of the sleeve 302 is opened up without further cutting down the ferrule and the optical lens. As a result, when two such collimators are arranged in such a way that the opened inner surfaces are intimately contacted, the lateral distance of the combined collimators is minimized.

Figure 5:
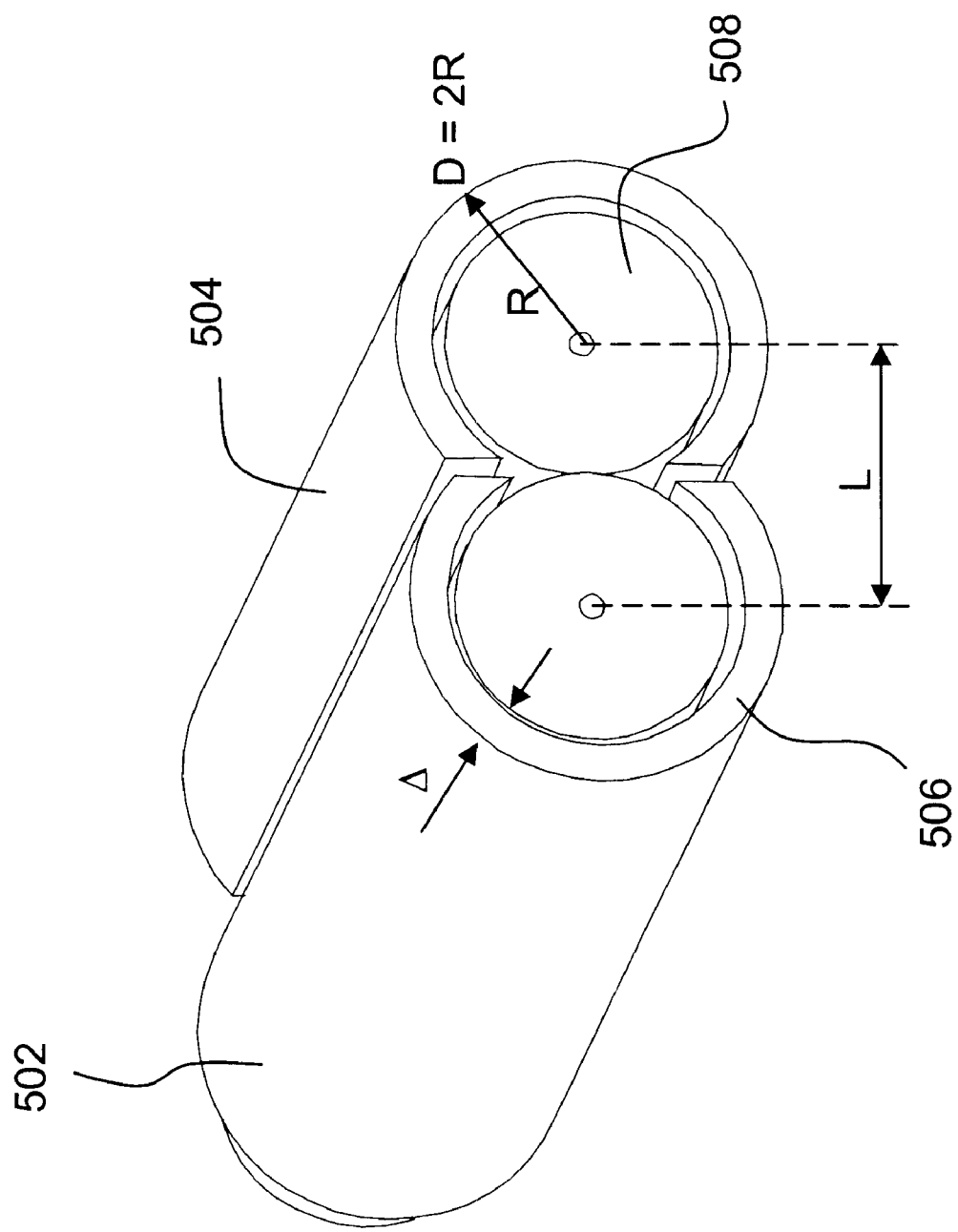
FIG. 5 illustrates two collimators being arranged next to each other, both of the collimators are designed according to the present invention.

FIG. 5 illustrates two collimators 502 and 504 being arranged next to each other. Both of the collimators 502 and 504 are designed according to the present invention. It is assumed that the size of the collimators 502 and 504 are identical. If the collimators are in different size in a very rare situation, the description herein can be readily appreciated by those skilled in the art and equally applied thereto.

A collimator (e.g. 502) includes a sleeve 506 enclosing a set of coaxially aligned ferrule and lens 508. Depending on an exact implementation, one or more fibers are disposed in the ferrule (not sown). From a cross section perspective of the collimator 502, the sleeve 506 has an outer diameter D and a circular thickness Δ (hence the inner diameter thereof is D-2Δ). Different from the prior art designs, the cross section of the sleeve 406 is now of "C" type. In other words, the sleeve 506 has a portion on one side flattened. Mechanically, a portion of the sleeve 506 is removed so that, when two of such collimators are arranged next to each other, the two flattened sides of the collimators can be intimately contacted. As a result, the lateral distance between the centers of the collimators can be smaller than the outer diameter.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, a sleeve may be flattened on both sides to facilitate an arrangement of three or more collimators. Also, the asymmetrical sleeve based collimators can extend in two directions by cutting appropriate interfaces. Accordingly, the scope of the present invention is defined by the appended claims rather than the forgoing description of embodiments.

We claim:

1. A compact polarization coupler comprising:
   two collimators outputting respectively a first and a second polarized light beams, wherein each collimator includes:
   an optical lens;
   a ferrule coaxially aligned with the optical lens;
   a sleeve encapsulating the ferrule and the optical lens, the sleeve having a round side with an outer radius extending along the sleeve, and a flattened side extending along the sleeve, the two such collimators being arranged with the flattened sides abutting each other such that a distance between centers of the two collimators is less than twice the outer radius of the sleeve; and
   a crystal receiving the first and the second polarized light beams respectively from the two collimators and combining the first and the second polarized light beams to form a combined light beam.

2. The compact polarization coupler of claim 1, wherein the crystal is of a birefringent type.

3. The compact polarization coupler of claim 1, wherein both of the two collimators are coupled to the crystal at one end.

4. The compact polarization coupler of claim 3, wherein the first and the second polarized light beams are projected respectively onto the crystal at the one end.

5. The compact polarization coupler of claim 1, wherein the flattened side of the sleeve is formed by removing a portion of the sleeve on the one side without affecting optical lens and ferrule encapsulated therein.

6. The compact polarization coupler of claim 5, wherein the portion of the sleeve on the flattened side is removed to an extend that the encapsulated optical lens and ferrule are not exposed.

7. The compact polarization coupler of claim 5, wherein side portions of the encapsulated optical lens and ferrule are exposed to minimize the distance between the centers of the two collimators.

8. The compact polarization coupler of claim 1, wherein a cross-section of the sleeve is of "C" type.

9. The compact polarization coupler of claim 1, wherein the first and the second polarized light beams are orthogonally polarized.

10. A compact polarization coupler comprising:
   a crystal receiving an incoming light beam and splitting the incoming light beam into a first and a second polarized light beams;
   two collimators coupled to the crystal at one end and respectively receiving the first and the second polarized light beams, wherein each collimator includes:
      an optical lens;
      a ferrule coaxially aligned with the optical lens;
      a sleeve encapsulating the ferrule and the optical lens, the sleeve having a round side with an outer radius extending along the sleeve, and a flattened side extending along the sleeve, the two collimators being arranged with the flattened sides abutting each other, such that a distance between centers of the two collimators is less than twice the outer radius of the sleeve.

11. The compact polarization coupler of claim 10, wherein the crystal is of a birefringent type.

12. The compact polarization coupler of claim 10, wherein the flattened surface of the sleeve is formed by removing a portion of the sleeve on the one side without affecting optical lens and ferrule encapsulated therein.

13. The compact polarization coupler of claim 12, wherein the portion of the sleeve on the flattened side is removed to an extent that the encapsulated optical lens and ferrule are not exposed.

14. The compact polarization coupler of claim 12, wherein side portions of the encapsulated optical lens and ferrule are exposed to minimize the distance between the centers of the two collimators.

15. The compact polarization coupler of claim 10, wherein a cross-section of the sleeve is of "C" type.

16. The compact polarization coupler of claim 10, wherein the first and the second polarized light beams are orthogonally polarized.

* * * * *